US012805435B2

(12) United States Patent
Desmet et al.

(10) Patent No.: US 12,805,435 B2
(45) Date of Patent: Nov. 24, 2026

(54) HINGED TRANSITION ZONE ON TOP OF RESIDUE SPREADER IN COMBINATION WITH INTEGRATED CHOPPER

(71) Applicants: CNH Industrial Belgium N.V., Zedelgem (BE); CNH Industrial America LLC, New Holland, PA (US); CNH Industrial (Harbin) Machinery Co., Ltd., Harbin (CN)

(72) Inventors: Stefaan Desmet, Vosselare (BE); Nathan E. Isaac, Lancaster, PA (US); Cooper Linde, Lancaster, PA (US); Ziying Zhao, Harbin (CN)

(73) Assignees: CNH Industrial Belgium N.V., Zedelgem (BE); CNH Industrial America LLC, New Holland, PA (US); CNH Industrial (Harbin) Machinery Co., Ltd., Harbin (CN)

( * ) Notice: Subject to any disclaimer, the term of this patent is extended or adjusted under 35 U.S.C. 154(b) by 337 days.

(21) Appl. No.: 18/530,386

(22) Filed: Dec. 6, 2023

(65) Prior Publication Data

US 2024/0237577 A1 Jul. 18, 2024

Related U.S. Application Data

(63) Continuation-in-part of application No. 18/098,403, filed on Jan. 18, 2023.

(51) Int. Cl.
*A01D 41/12* (2006.01)
*A01F 12/40* (2006.01)

(52) U.S. Cl.
CPC .......... *A01D 41/1243* (2013.01); *A01F 12/40* (2013.01)

(58) Field of Classification Search
CPC ............................ A01D 41/1243; A01F 12/40
(Continued)

(56) References Cited

U.S. PATENT DOCUMENTS 6,406,368 B1 6/2002 Cruson et al.
6,598,812 B1 7/2003 Matousek et al.
(Continued)

FOREIGN PATENT DOCUMENTS

CA 1222919 A 6/1987

OTHER PUBLICATIONS

Non-Final Office Action issued by the U.S. Patent and Trademark Office in U.S. Appl. No. 18/098,403, mailed Jul. 11, 2025, U.S. Patent and Trademark Office, Alexandria, VA. (34 pages).
(Continued)

*Primary Examiner* — Mahmoud S Ismail
(74) *Attorney, Agent, or Firm* — Buchanan Ingersoll & Rooney PC

(57) ABSTRACT

A crop residue spreader for an agricultural harvester having a spreader frame with counter-rotating impellers for discharging crop residue and a distribution hood mounted in close proximity to the impellers for deflecting crop residue discharged by the impellers. A common structural member independently supports both the spreader frame and the distribution hood. The distribution hood is movably connected to the common structural member, such that the distribution hood may be moved away from the spreader discharge to provide additional clearance for discharged crop residue to exit the spreader.

17 Claims, 20 Drawing Sheets

(58) Field of Classification Search
USPC .......................................................... 460/111
See application file for complete search history.

(56) References Cited

U.S. PATENT DOCUMENTS

| | | | |
|---|---|---|---|
| 7,553,227 B2 | 6/2009 | Landuyt | |
| 8,585,475 B2 | 11/2013 | Isaac et al. | |
| 9,271,447 B2 | 3/2016 | Murray et al. | |
| 9,370,141 B2 | 6/2016 | Isaac et al. | |
| 10,306,834 B2 | 6/2019 | Ballegeer et al. | |
| 11,019,768 B2 | 6/2021 | Rittershofer et al. | |
| 2016/0374267 A1 | 12/2016 | Reinecke et al. | |
| 2017/0094902 A1 | 4/2017 | Reinecke | |
| 2020/0045883 A1* | 2/2020 | De Baere | A01D 41/1243 |
| 2020/0196525 A1 | 6/2020 | Desmet et al. | |
| 2023/0103977 A1 | 4/2023 | Linde et al. | |

OTHER PUBLICATIONS

The Extended European Search Report issued Apr. 24, 2025, by the European Patent Office in corresponding European Patent Application No. 24218116.2. (8 pages).
U.S. Appl. No. 18/098,403, filed Jan. 18, 2023, 33 pages.

* cited by examiner

HINGED TRANSITION ZONE ON TOP OF RESIDUE SPREADER IN COMBINATION WITH INTEGRATED CHOPPER

CROSS-REFERENCE TO RELATED APPLICATION

This application is a continuation-in-part filed under 35 U.S.C. § 111 and claiming priority under 35 U.S.C. § 120 of and to U.S. Ser. No. 18/098,403, filed Jan. 18, 2023, the entire disclosure of which is incorporated herein by reference in its entirety and for all purposes.

FIELD OF THE INVENTION

The present invention relates to agricultural harvesters. More specifically, the present invention relates to a crop residue spreader for an agricultural harvester.

BACKGROUND OF THE INVENTION

Rotary threshing or separating systems are used in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor.

After discharge from the threshing system, the crop residue is typically directed into a crop residue distribution system located below and rearwardly of the rear end of the rotor. The crop residue distribution system typically includes a rotary beater or chopper or other apparatus that conveys and/or chops and propels the residue rearwardly towards an area within the rear end of the combine, hereinafter referred to as a distribution chamber. The crop residue provided within the distribution chamber may be (i) discharged therefrom onto a field as a windrow, (ii) directed into a crop residue spreader mounted on or at the rear end of the combine that is operable for spreading the residue over a swath of a field, or (iii) both (i) and (ii).

Windrowing typically occurs when users desire to retain the crop residue for post-processing. In such cases, the residue, which may be chopped or un-chopped, is discharged from the combine, without entering the chopper/spreader, to form a windrow directly behind the combine. A windrow door is typically positioned at the rear opening and is pivotable between a closed position, wherein the crop residue is diverted into the spreader, and an open position, wherein the crop residue is directed over the spreader, through the rear opening, onto a windrow chute and onto the field. When the crop residue is to be discharged onto a field to form a windrow, it is typically preferred that the crop residue be distributed onto the windrow chute extending from the rear opening to allow for the formation of a desirable windrow shape.

A crop residue spreader mounted on or at the rear end of the combine is configured to distribute the processed crop materials or residue over a harvested field. Spreader assemblies typically include counter rotating disks or impellers mounted on a frame for receiving all or part of the processed crop material or residue from the distribution chamber and spreading the material in a generally even side to side manner behind the harvester. As is described in U.S. Pat. No. 8,585,475 to CNH America LLC (the '475 Patent), the disclosure of which is incorporated by reference in its entirety and for all purposes, the spreader assembly may be pivotably mounted, such that the spreader assembly can be moved between operating and inoperative positions depending on the desired operating state of the harvester.

The spreader assembly may include a transition hood, also known as a distribution hood or a spreader hood, specially configured for spreading chaff in a uniform manner and positioned at or near the outlet of the impellers. The transition hood may be provided with a stationary or movable deflector to modify the distribution of the crop residue exiting the rotary disks, for example, to deposit crop residue more evenly across the width of the harvester or across the distribution area behind the harvester.

US 2020/0196525 A1, US 2020/0045883 A1, and US 2016/0374267 A1, the disclosures of which are incorporated herein by reference each in their entirety and for all purposes, describe moveable deflection distributors mounted directly to the spreader frame. The deflectors are mounted directly to the spreader frame between the impellers at their outlet, with the mounting and/or activating elements positioned within the impeller housing. These spreader assemblies and others, wherein the distribution deflector and/or distribution hood are connected directly to the spreader frame, allow that crop material can bridge across the impeller housing and/or hood divider to plug or block the spreader and interrupt operation of the harvester.

Prior unpublished U.S. application Ser. No. 18/098,403, filed Jan. 18, 2023, the disclosure of which is incorporated by reference in its entirety and for all purposes, discloses a crop residue spreader for an agricultural harvester having a spreader frame with counter-rotating impellers for discharging crop residue and a distribution deflector mounted in close proximity to the impellers for deflecting crop residue discharged by the impellers. A common structural member independently supports both the spreader frame and the distribution deflector, such that the distribution deflector does not contact the spreader frame and connects to the spreader frame only indirectly through the common structural member, forming a gap between the spreader frame and the distribution deflector across the discharge area to provide clearance for discharged crop residue to exit the spreader without plugging or clogging.

Plugging or clogging can persist, however, when crop and/or harvesting conditions involve, for example, the spreading of unchopped or long straw, or the spreading of damp or high-yielding straw, or the spreading of other crop residues, such as rice, that may be prone to clogging. In very difficult conditions, the operator may be required periodically to interrupt operation of the harvester to service a clogged spreader, reducing harvest efficiency.

In view of the foregoing, it would be desirable to provide a spreader assembly capable of being configured in very difficult conditions so that crop material has an exit path from the spreader without blocking, plugging, or binding in the transition zone.

Although various components of agricultural harvesters are mentioned in the Background section, such disclosure is not an admission that those components are admitted prior art.

SUMMARY OF THE INVENTION

According to one aspect of the invention, a crop residue spreader for an agricultural harvester comprises: a spreader frame; one or more impellers mounted on the spreader frame for receiving a crop residue from a crop threshing and/or cleaning system of the harvester and discharging the crop residue from the harvester; a distribution hood mounted in close proximity to the impellers for distributing a flow of crop residue discharged by the impellers; and a common structural member independently supporting both the spreader frame and the distribution hood, the distribution hood being supported for pivotable movement relative to the spreader frame along a path from a forward distributing position for receiving and distributing the flow of crop material discharged by the impellers to a rear position upward and rearward of the forward distributing position.

According to another aspect of the invention, the one or more impellers comprise two or more counter-rotating impellers.

According to another aspect of the invention, the distribution hood in the rear position is positioned at least partly outside the flow of crop material discharged by the impellers.

According to another aspect of the invention, the distribution hood is attached to the common structural member by one or more swing (or pivot) arms each comprising one or more pivot points enabling the pivotable movement of the distribution hood relative to the spreader frame along the path from the forward distributing position to the rear position.

According to another aspect of the invention, the spreader further comprises a locking mechanism for fixing the distribution hood at a position along the path from the forward distributing position to the rear position.

According to another aspect of the invention, the distribution hood in the rear position is positioned entirely outside the flow of crop material discharged by the one or more impellers.

According to another aspect of the invention, the common structural member is mounted to a straw hood of the agricultural harvester.

According to another aspect of the invention, the common structural member comprises one or more spreader swing arms.

According to another aspect of the invention, the one or more spreader swing arms comprise one or more pivot points enabling the pivotable movement of the spreader frame relative to the straw hood along a path from the forward spreading position to a rear position upward and rearward of the forward spreading position.

According to another aspect of the invention, an agricultural harvester comprises a crop residue spreader for an agricultural harvester, the crop residue spreader comprising: a spreader frame; one or more impellers mounted on the spreader frame for receiving a crop residue from a crop threshing and/or cleaning system of the harvester and discharging the crop residue from the harvester; a distribution hood mounted in close proximity to the impellers for distributing a flow of crop residue discharged by the impellers; and a common structural member independently supporting both the spreader frame and the distribution hood, the distribution hood being supported for pivotable movement relative to the spreader frame along a path from a forward distributing position for receiving and distributing the flow of crop material discharged by the impellers to a rear position upward and rearward of the forward distributing position.

According to another aspect of the invention, an agricultural harvester comprises: a crop threshing and/or cleaning system producing a flow or stream of crop residue; a rear cavity enclosed by a straw hood for receiving the flow or stream of crop residue from the threshing and/or cleaning system; and a crop residue spreader for an agricultural harvester, the spreader comprising: a spreader frame; one or more impellers mounted on the spreader frame for receiving a crop residue from a crop threshing and/or cleaning system of the harvester and discharging the crop residue from the harvester; a distribution hood mounted in close proximity to the impellers for distributing a flow of crop residue discharged by the impellers; and a common structural member independently supporting both the spreader frame and the distribution hood, the distribution hood being supported for pivotable movement relative to the spreader frame along a path from a forward distributing position for receiving and distributing the flow of crop material discharged by the impellers to a rear position upward and rearward of the forward distributing position.

According to another aspect of the invention, a crop residue spreader for an agricultural harvester comprises: a spreader frame; counter-rotating impellers mounted on the spreader frame for receiving a crop residue from a threshing system and/or cleaning system of the harvester and discharging the crop residue from the harvester; a distribution hood mounted in close proximity to the impellers for distributing a crop residue discharged by the impellers; and a common structural member independently supporting both the spreader frame and the distribution hood, wherein the spreader frame and the distribution hood form a gap for the discharging crop residue to exit the spreader without binding.

According to another aspect of the invention, the spreader frame further comprises a housing at least partially enclosing the impellers.

According to another aspect of the invention, the distribution hood comprises a distribution deflector for deflecting the discharging crop residue.

According to another aspect of the invention, the distribution deflector is an oscillating distribution deflector.

According to another aspect of the invention, the distribution hood comprises a support member for the distribution deflector.

According to another aspect of the invention, a rotating shaft suspended from the distribution deflector support member oscillates the distribution deflector.

According to another aspect of the invention, a hydraulic driver drives the rotating shaft.

According to another aspect of the invention, the hydraulic driver is connected to the distribution deflector by a pitman arm.

According to another aspect of the invention, the distribution hood comprises a divider facing the discharging crop residue.

According to another aspect of the invention, the divider covers the support member supporting the distribution deflector.

According to another aspect of the invention, the distribution deflector comprises a replaceable nose cap.

According to another aspect of the invention, the common structural member comprises one or more spreader swing arms.

According to another aspect of the invention, the one or more swing arms are mounted to a straw hood of the agricultural harvester.

According to another aspect of the invention, an agricultural harvester comprises a crop residue spreader, wherein the crop residue spreader comprises: a spreader frame; counter-rotating impellers mounted on the spreader frame for receiving and discharging crop residue; a distribution hood mounted in close proximity to the impellers for distributing a crop residue discharged by the impellers; and a common structural member independently supporting both the spreader frame and the distribution hood, wherein the spreader frame and the distribution hood form a gap for the discharging crop residue to exit the spreader without binding.

According to another aspect of the invention, an agricultural harvester comprises: a threshing system and/or a cleaning system producing a flow or stream of crop residue; a rear cavity enclosed by a straw hood for receiving the flow or stream of crop residue from the threshing system and/or the cleaning system; and a crop residue spreader for an agricultural harvester, the spreader comprising: a spreader frame; counter-rotating impellers mounted on the spreader frame for receiving the flow or stream of crop residue from the rear cavity of the straw hood and discharging the crop residue from the harvester; a distribution hood mounted in close proximity to the impellers for distributing a crop residue discharged by the impellers; and a common structural member independently supporting both the spreader frame and the distribution hood, wherein the spreader frame and the distribution hood form a gap for the discharging crop residue to exit the spreader without binding.

The crop residue spreader of the invention provides a clear path for exiting crop material without binding and a reliable means to support an oscillating deflector to ensure uniform crop residue distribution behind the harvester. The crop residue spreader of the invention further is capable of being configured in very difficult conditions so that crop material has an exit path from the spreader without blocking, plugging, or binding in the transition zone.

BRIEF DESCRIPTION OF THE DRAWINGS

The above-mentioned and other features and advantages of this invention, and the manner of attaining them, will become more apparent, and the invention will be better understood, by reference to the following description of an embodiment of the invention taken in conjunction with the accompanying drawings, wherein.

DETAILED DESCRIPTION OF THE INVENTION

Figure 1:
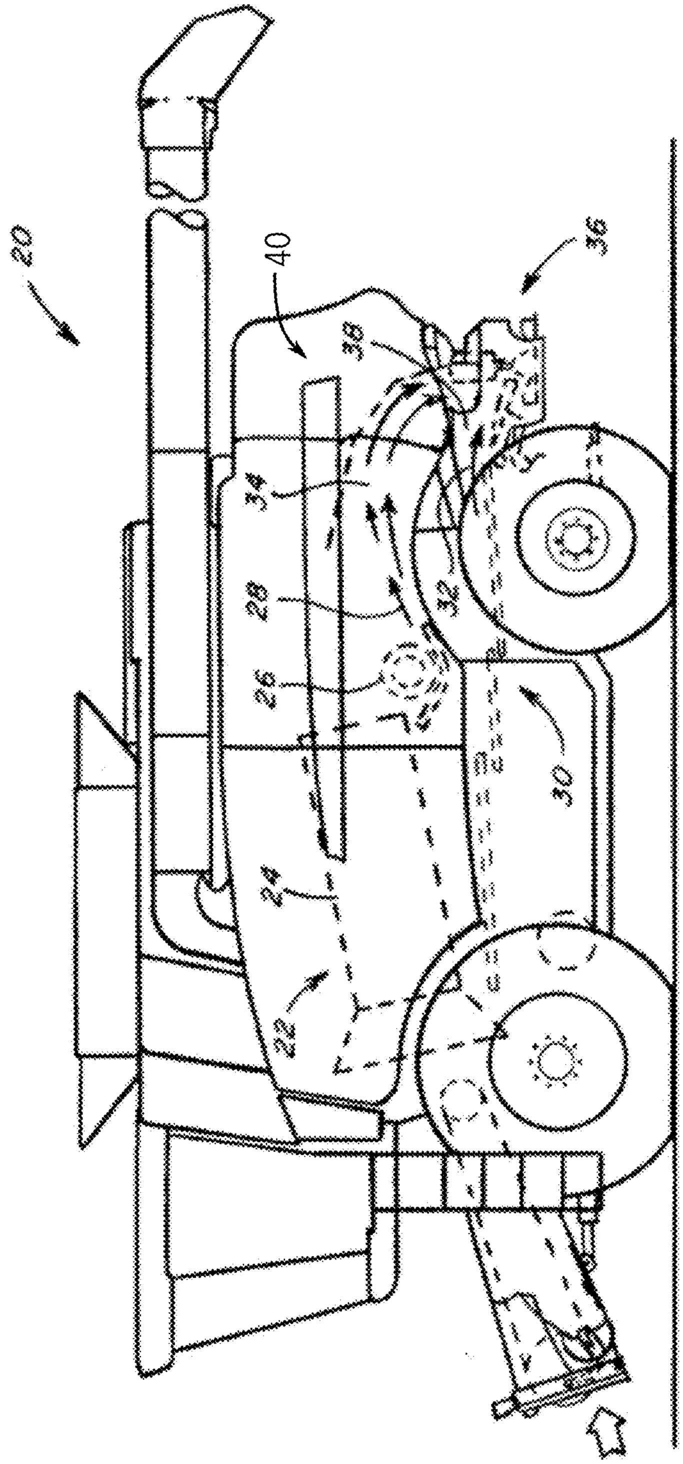
FIG. 1 is a side elevation view of an agricultural harvester, shown schematically.
Figure 2:
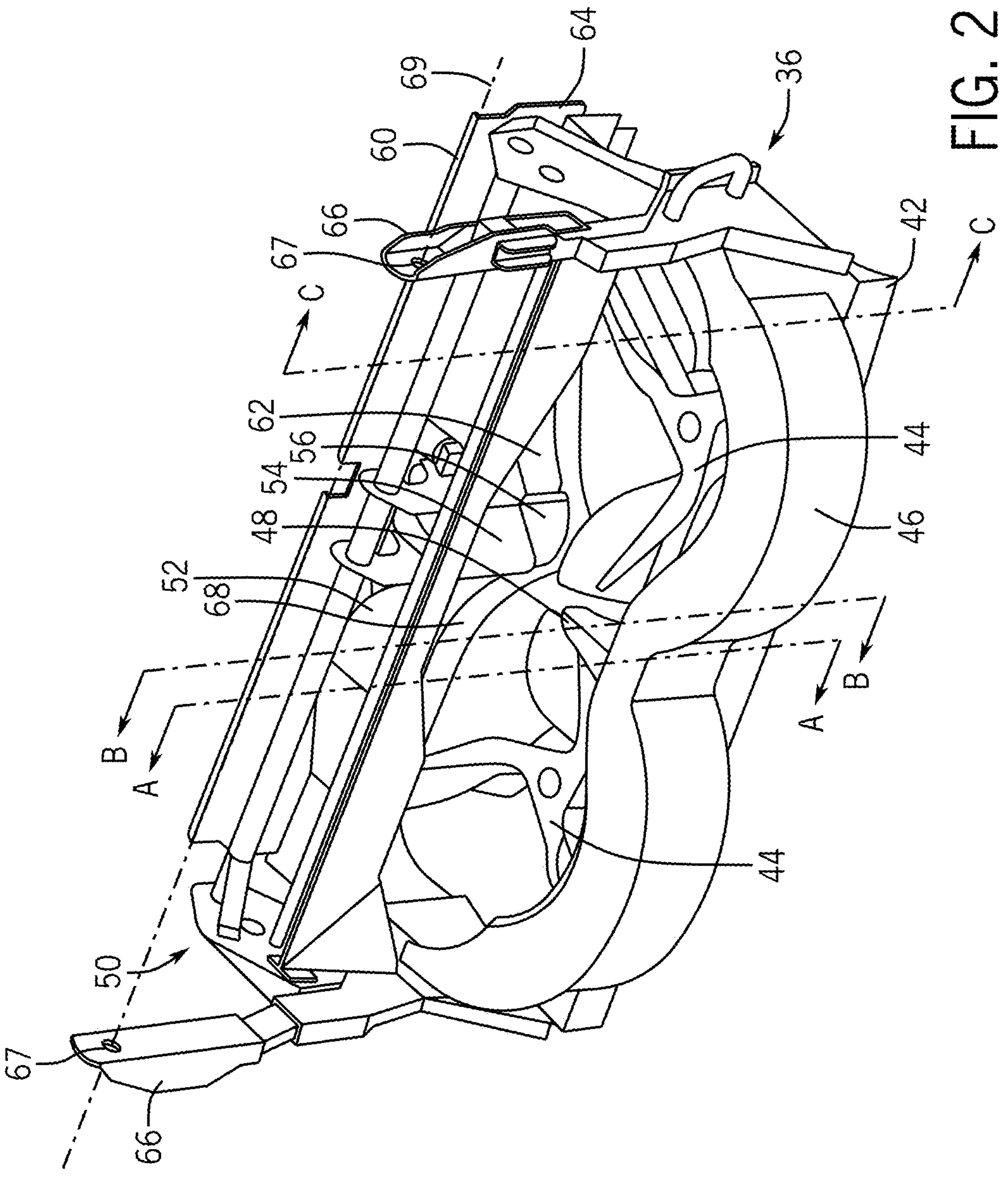
FIGS. 2 and 3 are isometric views of an embodiment of a crop residue spreader formed according to the present invention, showing the spreader swing arms independently supporting the spreader frame and transition hood.
Figure 3:
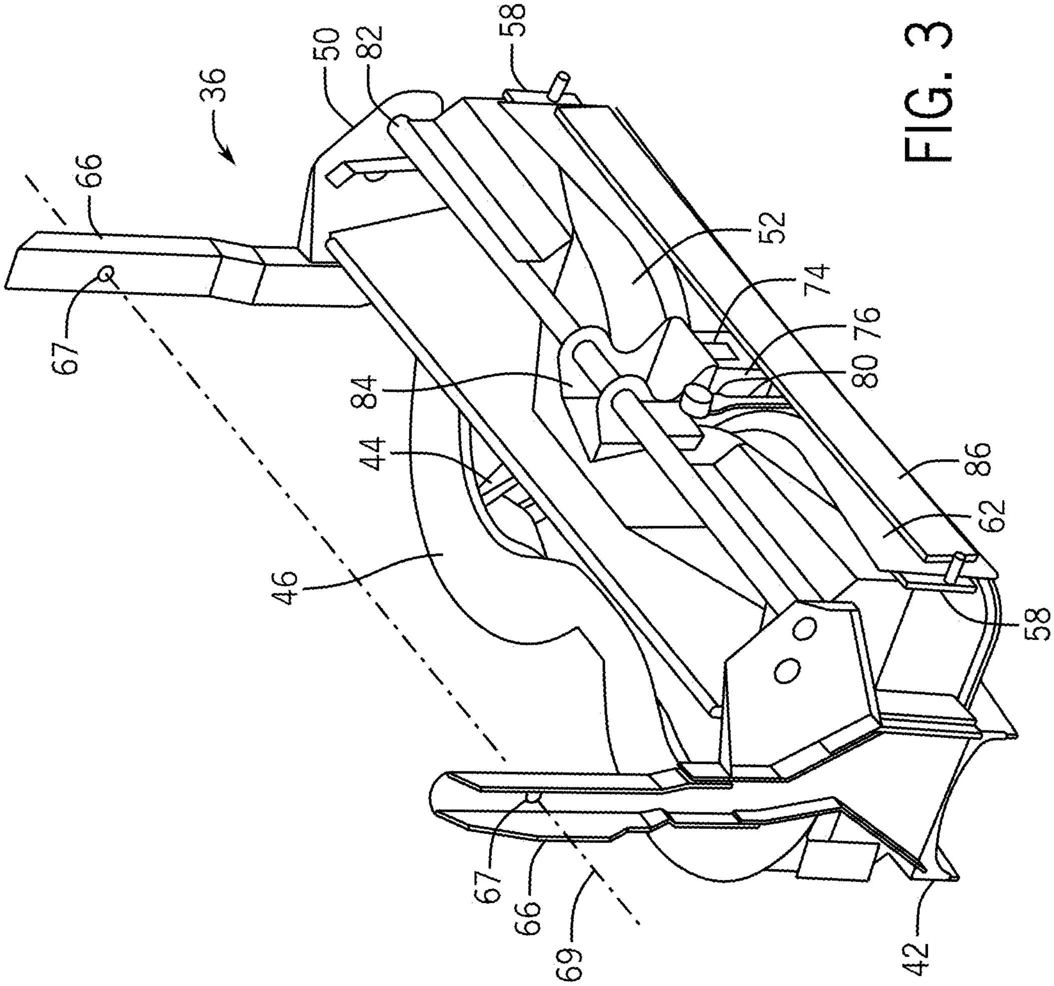
Figure 4:
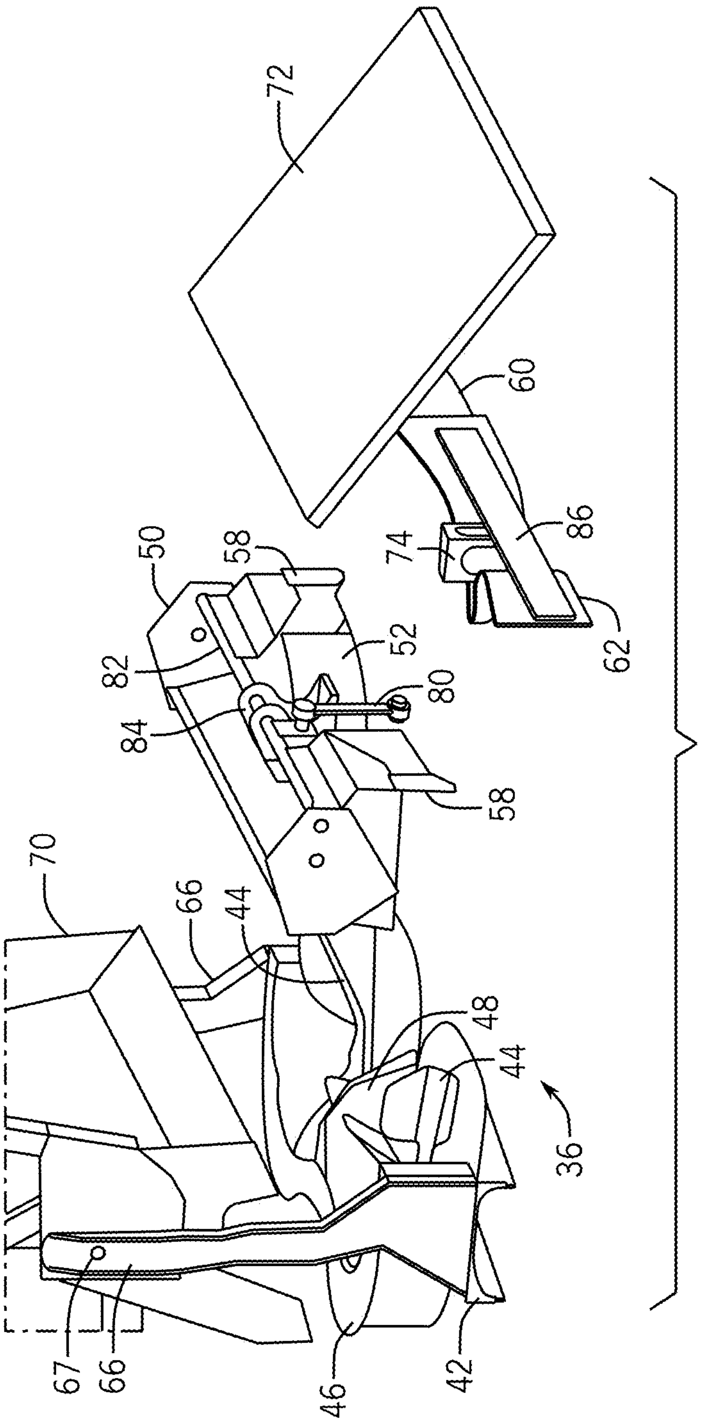
FIG. 4 is a partially-exploded isometric view of the crop residue spreader of FIG. 3, shown with windrow chute and swath board.

Corresponding reference characters indicate corresponding parts throughout the several views. The exemplifications set out herein illustrate one or more embodiments of the invention, in the described forms, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus, "grain" refers to that part of the crop material that is threshed and separated from the part of the crop material to be discarded, which is referred to as chaff and includes straw, and other non-grain crop material.

Also, the terms "forward", "rearward", "left" and "right", when used in connection with the agricultural harvester and/or components thereof, are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 1.

Referring now to the drawings, and more particularly to FIG. 1, there is shown an agricultural combine 20. Combine 20 includes a threshing system 22 having a rotor 24 rotatable for separating straw 28 from the harvested crop, and a beater 26 rotatable for propelling or directing a flow or stream of straw 28 rearwardly along an airborne trajectory through a rear cavity 34 enclosed by a straw hood 40.

Combine 20 also includes a cleaning system 30 for receiving the harvested crop from threshing system 22 and removing chaff 32 from the grain and directing a flow or stream of chaff 32 rearwardly through a lower region of rear cavity 34, towards a lower opening 38 in which a crop residue spreader 36, is shown located, constructed and operable according to the present invention. FIGS. 2-19 depict in greater detail the crop residue spreader 36.

Figure 5:
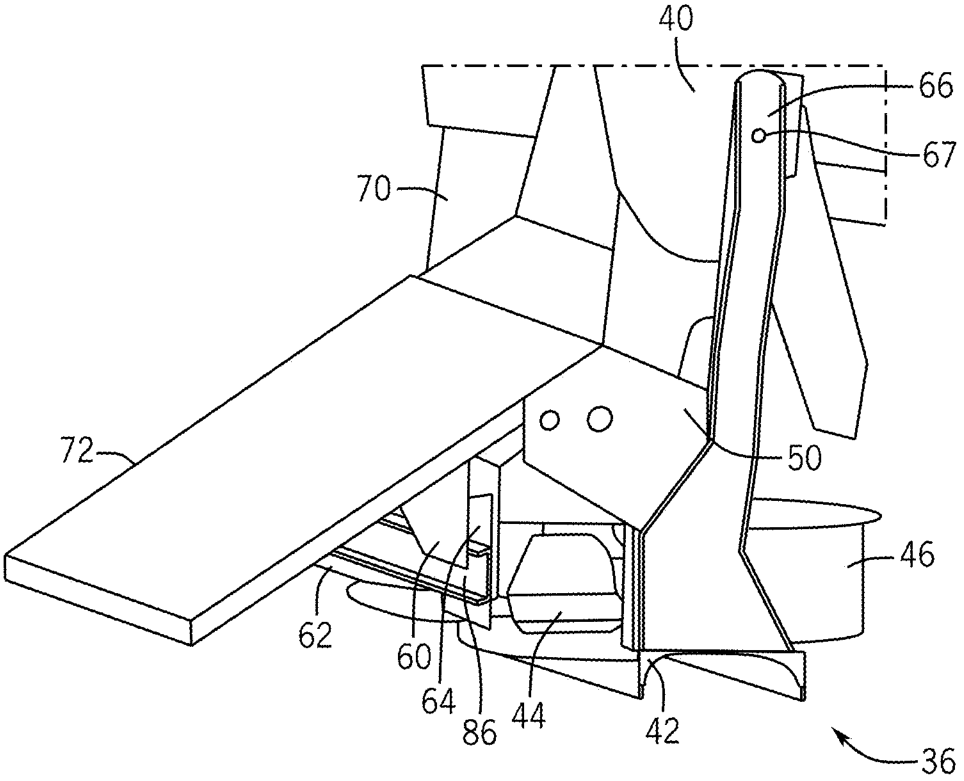
FIG. 5 is an isometric view of the assembled crop residue spreader of FIG. 4 in the spreading position.
Figure 5A:
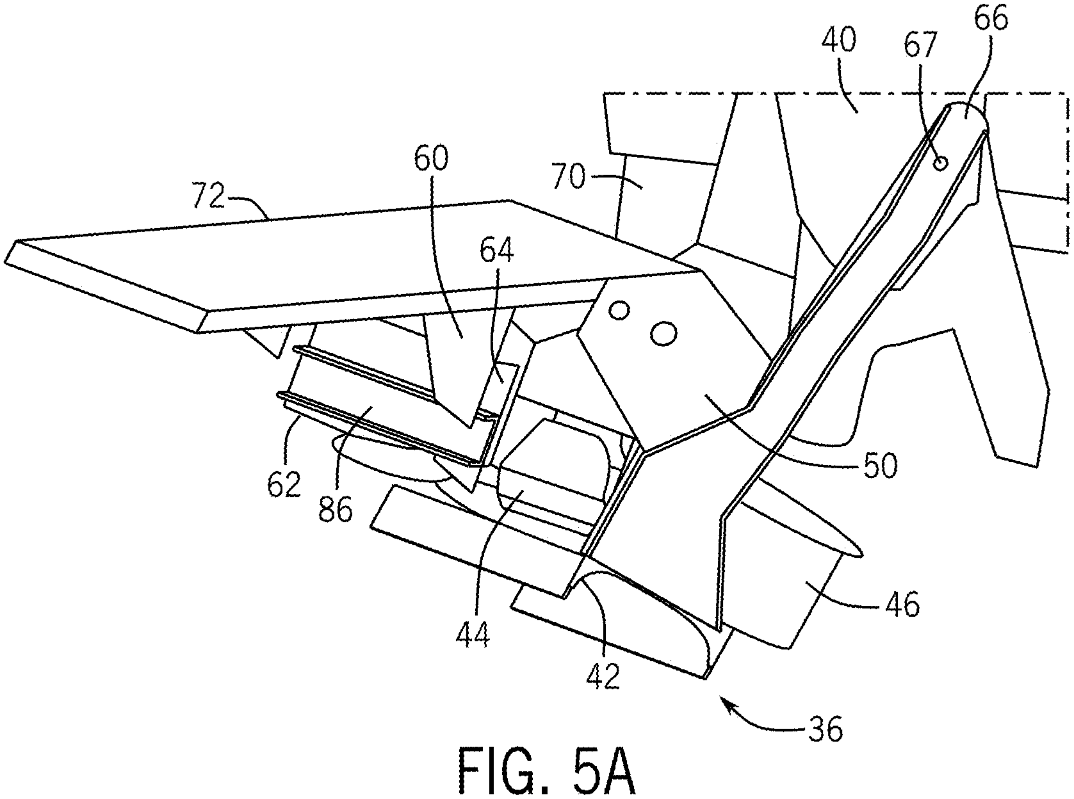
FIG. 5A is an isometric view of the assembled crop residue spreader of FIG. 4 in the storage position.
Figure 6:
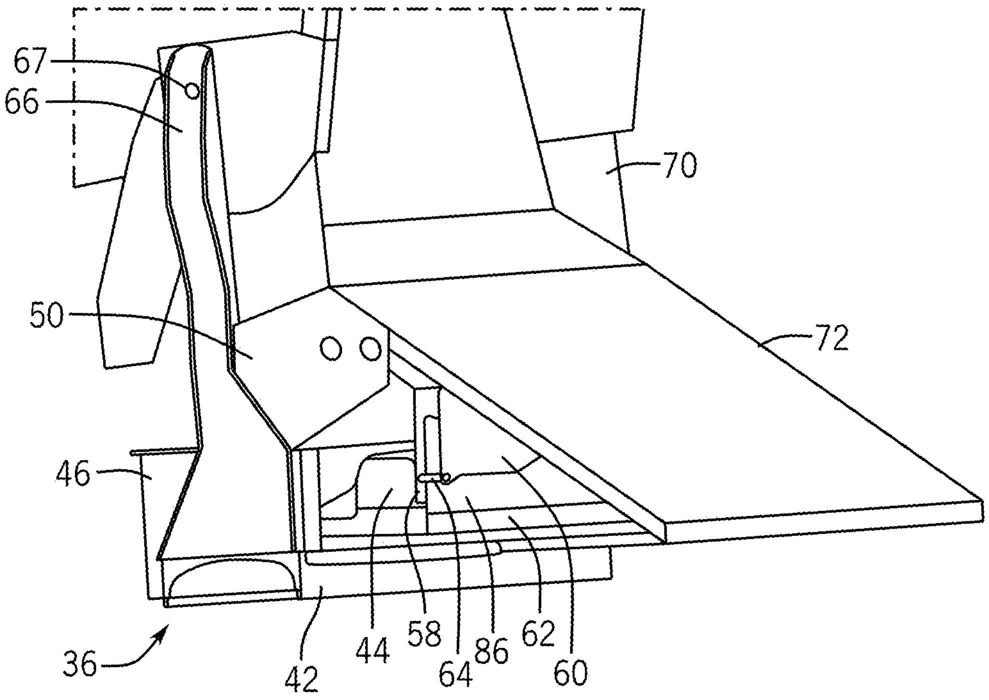
FIG. 6 is an isometric view of the assembled crop residue spreader of FIG. 4 in the spreading position.
Figure 7:
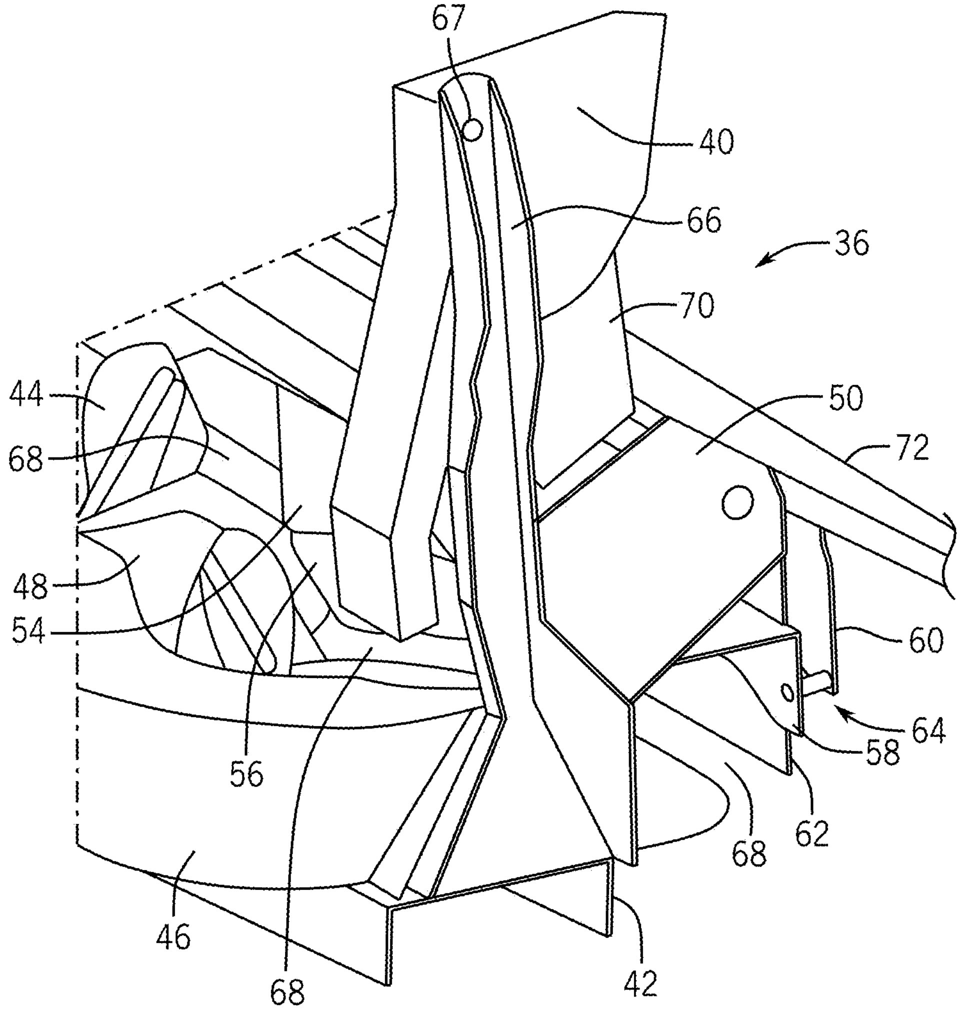
FIG. 7 is an isometric detail view of the assembled crop residue spreader of FIG. 4.

Referring now to FIGS. 2 through 8, there is shown a crop residue spreader 36 for an agricultural harvester 20, including a structural member in the form of a pair of swing arms 66 for mounting the spreader 36 to the straw hood 40. According to a preferred aspect of the invention, spreader 36 is supported for pivotable movement relative to straw hood 40 about an axis 69 defined by pivot points 67 on swing arms 66 along a path between a forward spreading position, depicted in FIGS. 4, 5, and 6-8, for receiving at least the flow of chaff 32 from cleaning system 30, and also the flow of straw 28 in some configurations, and a rear position, depicted in FIG. 5A, upward and rearward of the forward spreading position, also referred to as a storage position. A locking mechanism (not shown) may be provided to enable the position of the spreader 36 to be fixed in the forward spreading position, the rearward or storage position, or any desired position between the forward and rearward positions. Fixation of the position of the spreader 36 along the path from the forward spreading position to the rear position may be provided by any suitable mechanism known to the skilled artisan, including a pin, nut, bolt, ratchet, or any structure that would enable the spreader 36 to be fixed in a desired position along the path from the forward spreading position to the rearward position.

Spreader frame 42 is mounted to swing (or pivot) arms 66, and mounted on spreader frame 42 are a pair of counter-rotating impellers 44. Impellers 44 are configured to receive a crop residue (i.e., straw 28 and/or chaff 32) from, for example, the threshing system 22 and/or cleaning system 30 of the harvester 20 through lower opening 38. Impellers 44 are at least partially surrounded by housing 46, the housing 46 being substantially open in the rearward direction to allow the impellers 44 to discharge the crop residue to the rear of the harvester 20. A center section 48 of the impeller housing 46 extends and tapers rearwardly between the impellers 44, partially separating and dividing the impellers 44. Impellers 44 may also be provided with movable hoods (not shown) to modify the flow of crop residue exiting the impeller housing 46. An example of such a movable impeller housing is described in U.S. Pat. No. 9,370,141, the entire disclosure of which is incorporated herein by reference in its entirety and for all purposes.

Distribution hood 50 is mounted on swing arms 66 in close proximity to the impellers 44 and impeller housing 46 in a rearward direction facing the discharge of crop residue from the impellers 44. Spreader frame 42 and distribution hood 50 are commonly but separately connected to swing arms 66. Swing arms 66 independently support both spreader frame 42 and distribution hood 50 without direct connection of spreader frame 42 to distribution hood 50, with a gap 68 opening between the spreader frame 42 and distribution hood 50. Gap 68 allows that crop residue ejected by impellers 44 may exit the impeller housing 46 without bridging, binding, or catching on the housing 46 or distribution hood 50 and clogging the spreader 36.

Figure 18:
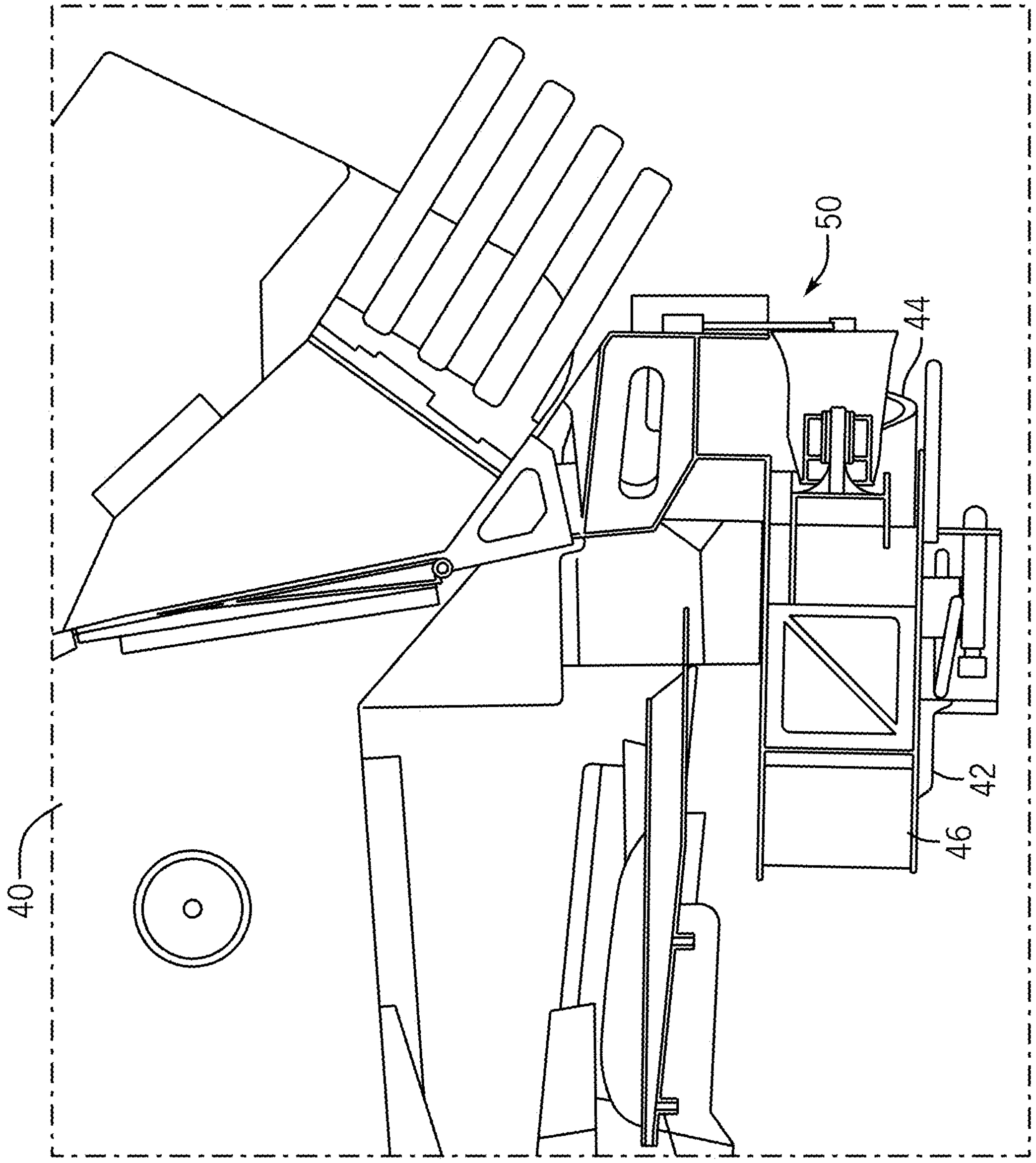
FIG. 18 is a side elevation cross-sectional view of an embodiment of a crop residue spreader formed according to the present invention, shown with the distribution head in a forward distributing position.
Figure 19:
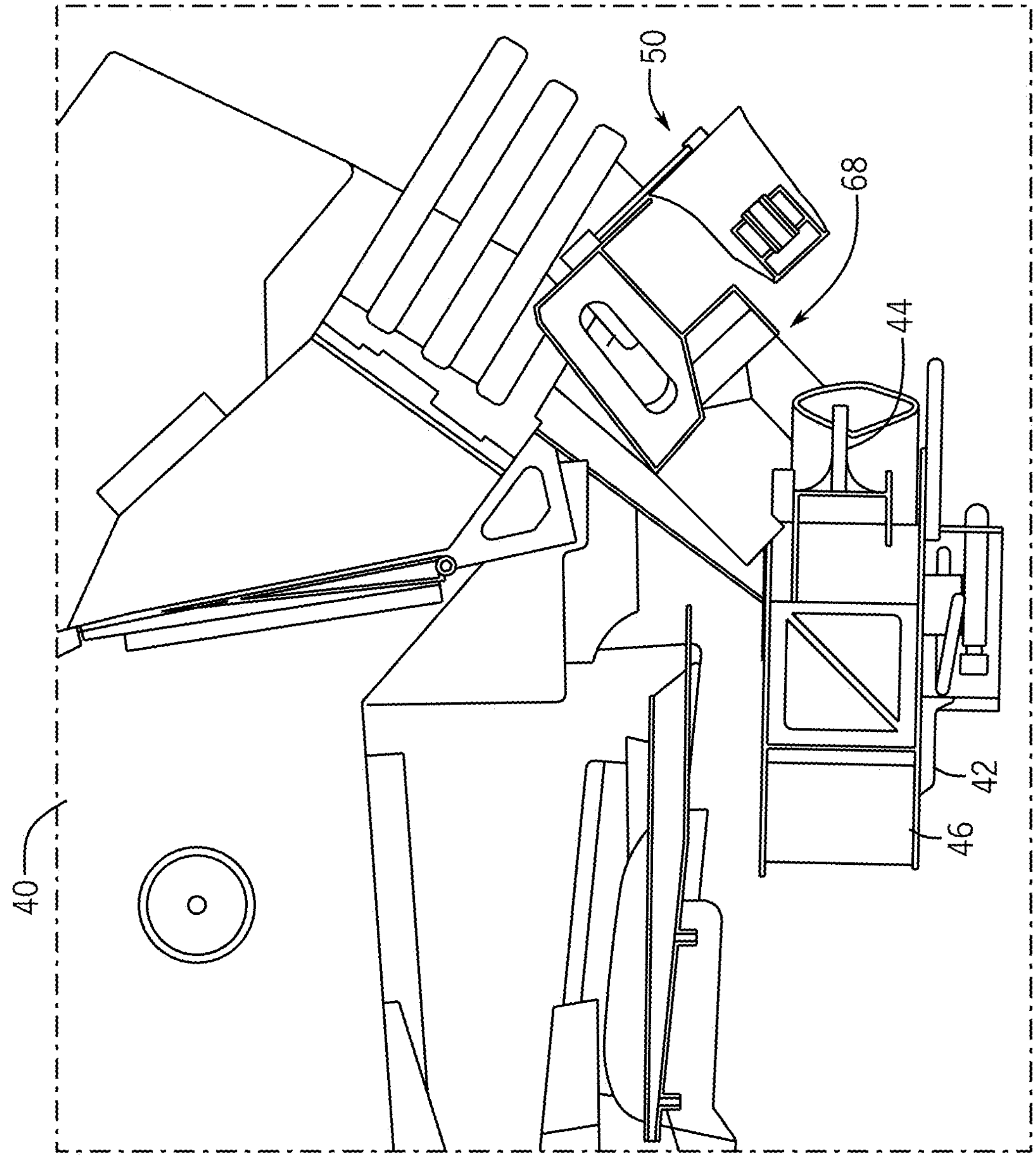
FIG. 19 is a side elevation cross-sectional view of an embodiment of a crop residue spreader formed according to the present invention, shown with the distribution head in a rear position upward and rearward of the forward distributing position.

Distribution hood 50 is supported by swing arms 66 for pivotable movement of the distribution hood relative to the swing arms 66 and/or the spreader frame 42 along a path from a forward distributing position for receiving and distributing the flow of crop material discharged by the impellers, depicted in FIGS. 2, 3, 5, 6-11, 13-15, and 18 to a rear position upward and rearward of the forward distributing position, depicted in FIG. 19. The distribution hood 50 in the rear position is positioned at least partly, and in some embodiments, entirely outside the flow of crop material (i.e., straw 28 and/or chaff 32) discharged rearwardly by the impellers 44.

A pivotable attachment of the distribution hood 50 to the common structural member (i.e., swing arm 66) enables the pivotable movement of the distribution hood 50 relative to the swing arms 66 and/or the spreader frame 42 along the path from the forward distributing position to the rear position. Such pivotable attachment may be provided by any suitable mechanism known to the skilled artisan, including a hinge, shaft, bar, bearing, pivot, sliding joint, linkage, or any structure that would enable the distribution hood 50 to move upward and rearward from the forward distributing position, away from the discharge of crop material from the impellers 44. A locking mechanism (not shown) may be provided to enable the position of the distribution hood 50 to be fixed in the forward distributing position, the rearward position, or any desired position between the forward and rearward positions. Fixation of the position of the distribution hood 50 along the path from the forward distributing position to the rear position may be provided by any suitable mechanism known to the skilled artisan, including a pin, nut, bolt, ratchet, or any structure that would enable the distribution hood 50 to be fixed in a desired position along the path from the forward distributing position to the rearward position.

Referring also now to FIGS. 4-7, distribution hood 50 includes distribution hood divider 52, divider nose piece 54, divider nose cap 56, divider wings 58, and distribution hood frame 82. Suspended from the midpoint of distribution hood frame 82 and at least partially housed within divider 52 is deflector mounting bracket 84, which supports oscillating deflector 62. Aft of divider 52 and divider wings 58, oscillating deflector 62 is mounted to deflector mounting bracket 84 via deflector shaft mount 74. Windrow chute 70 is positioned generally above distribution hood 50 at the rear of straw hood 40. Extending rearwardly over distribution hood 50 from windrow chute 70 is swath board 72. Rear baffle 60 is suspended from swath board 72 aft of oscillating deflector 62 and deflector frame 86, forming recess 64 between rear baffle 60 and separator wings 58. In operation, deflector 62 oscillates at least partly into and out of recess 64 to alter the trajectory of crop residue ejected from the impeller housing 46 by impellers 44.

Figure 8:
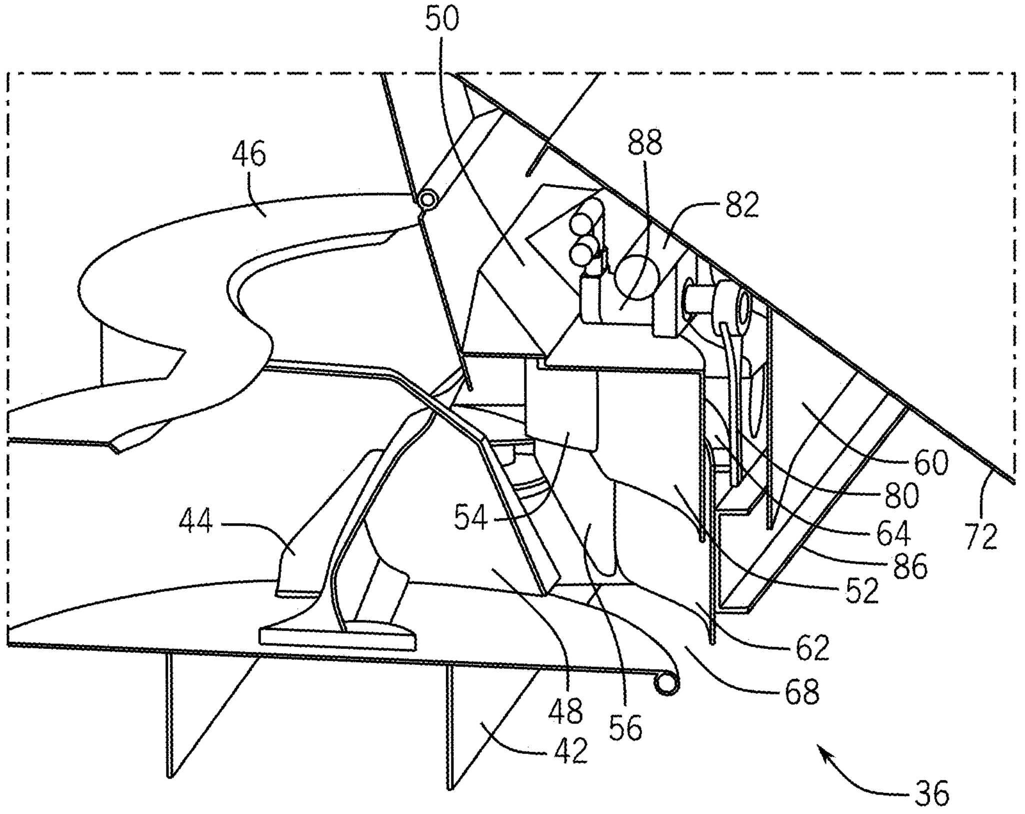
FIG. 8 is a cross-sectional detail view of the crop residue spreader of FIG. 2 taken through plane C-C.
Figure 9:
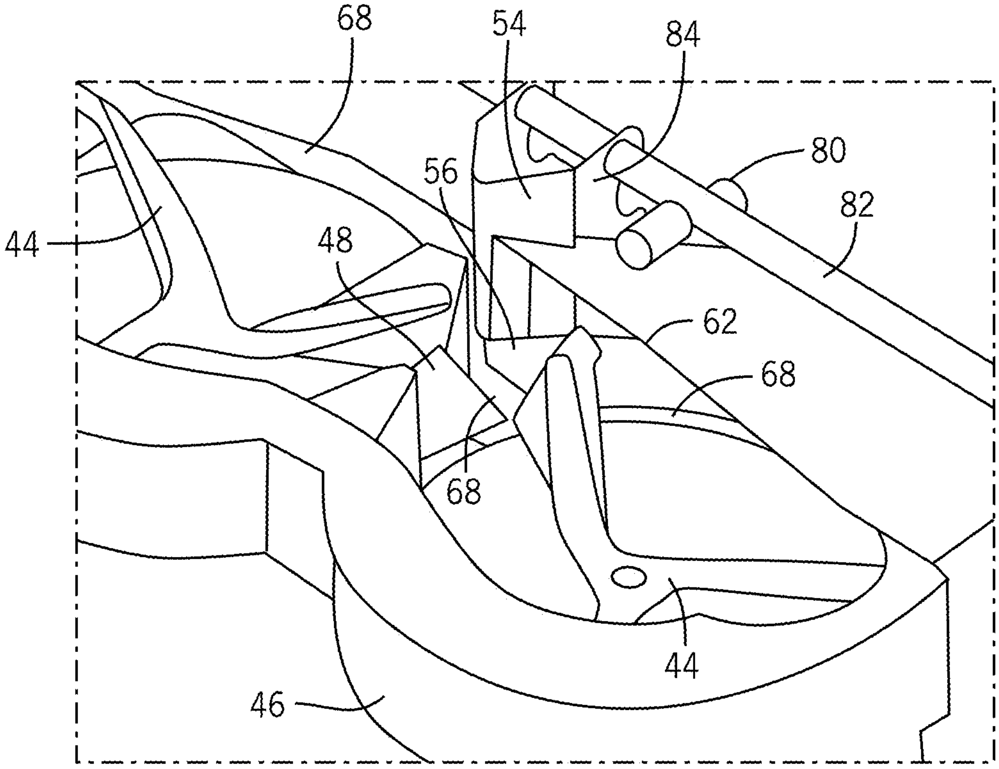
FIG. 9 is an isometric detail of the crop residue spreader of FIG. 11.
Figure 10:
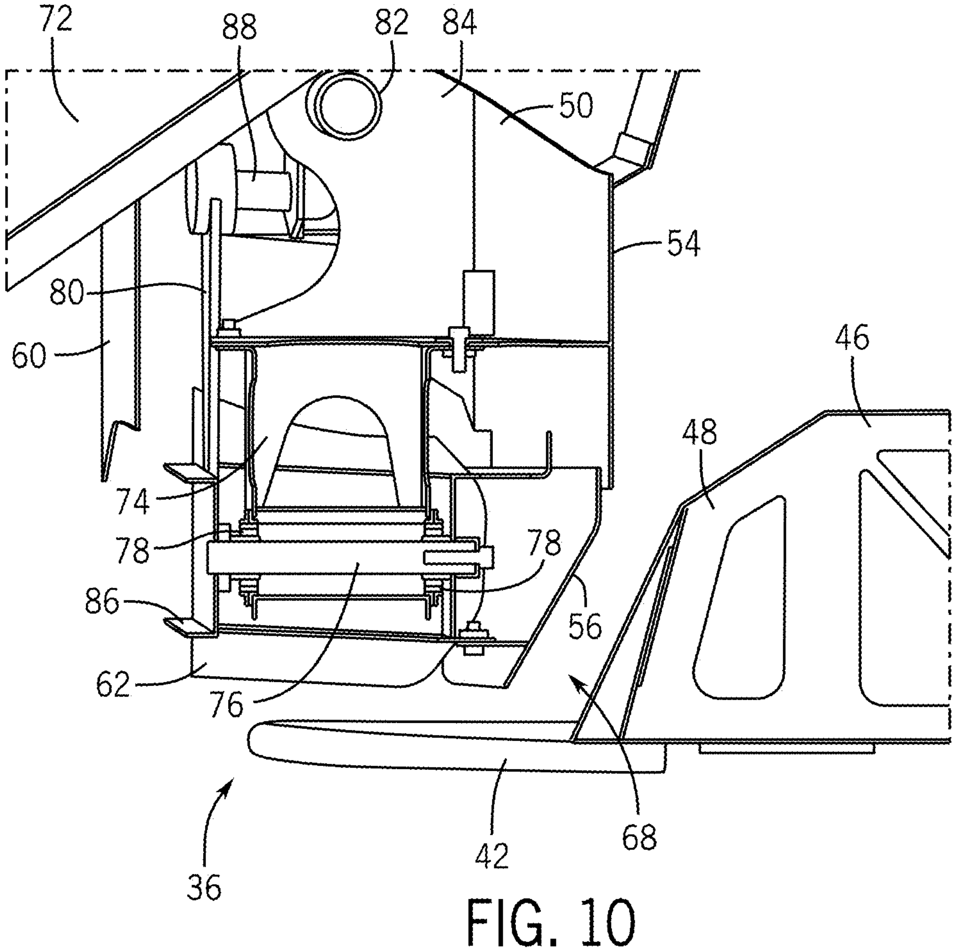
FIG. 10 is a cross-sectional detail view of the crop residue spreader of FIG. 2 taken through plane A-A.
Figure 11:
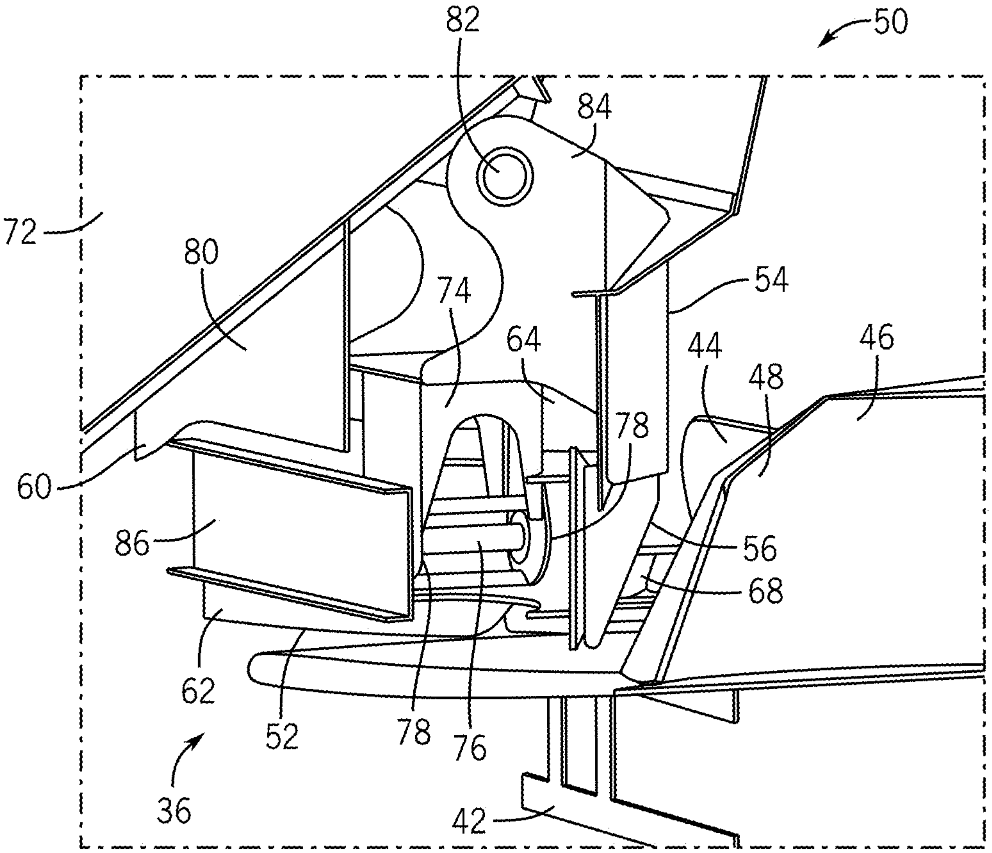
FIG. 11 is a cross-sectional detail view of the crop residue spreader of FIG. 2 taken through plane B-B.
Figure 12:
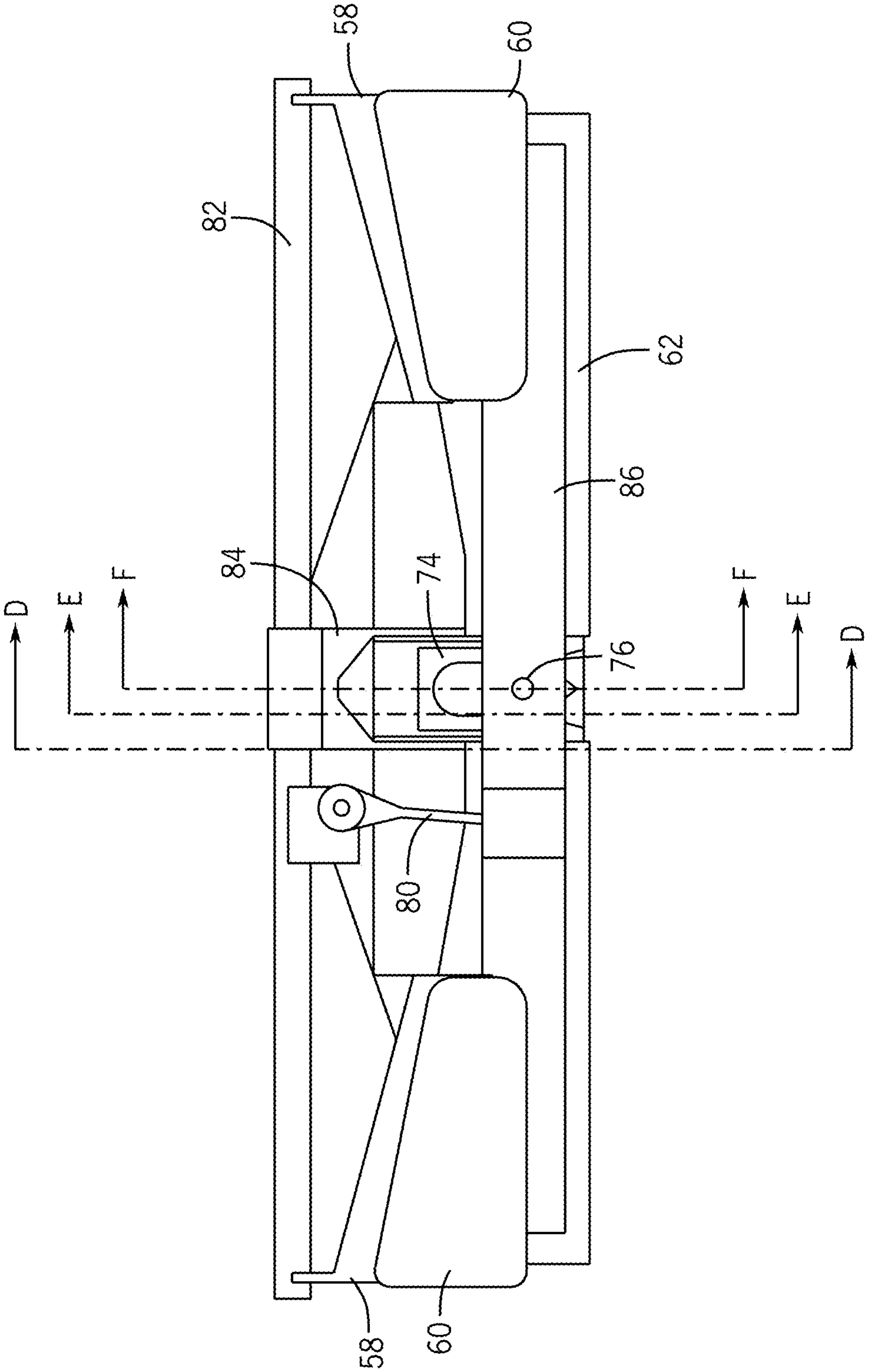
FIG. 12 is a rear elevation view of an embodiment of a crop residue spreader according formed according to the present invention, showing details of the distribution hood and oscillating deflector.
Figure 13:
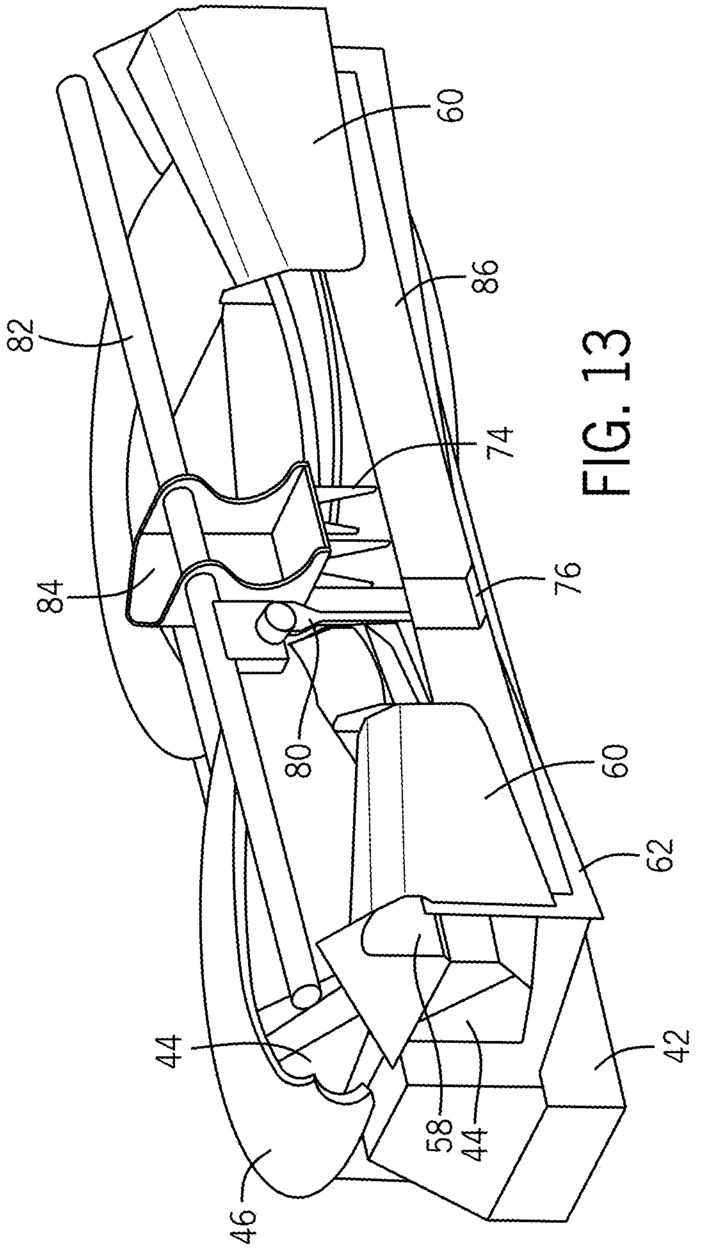
FIG. 13 is an isometric view of the crop residue spreader of FIG. 11.
Figure 14:
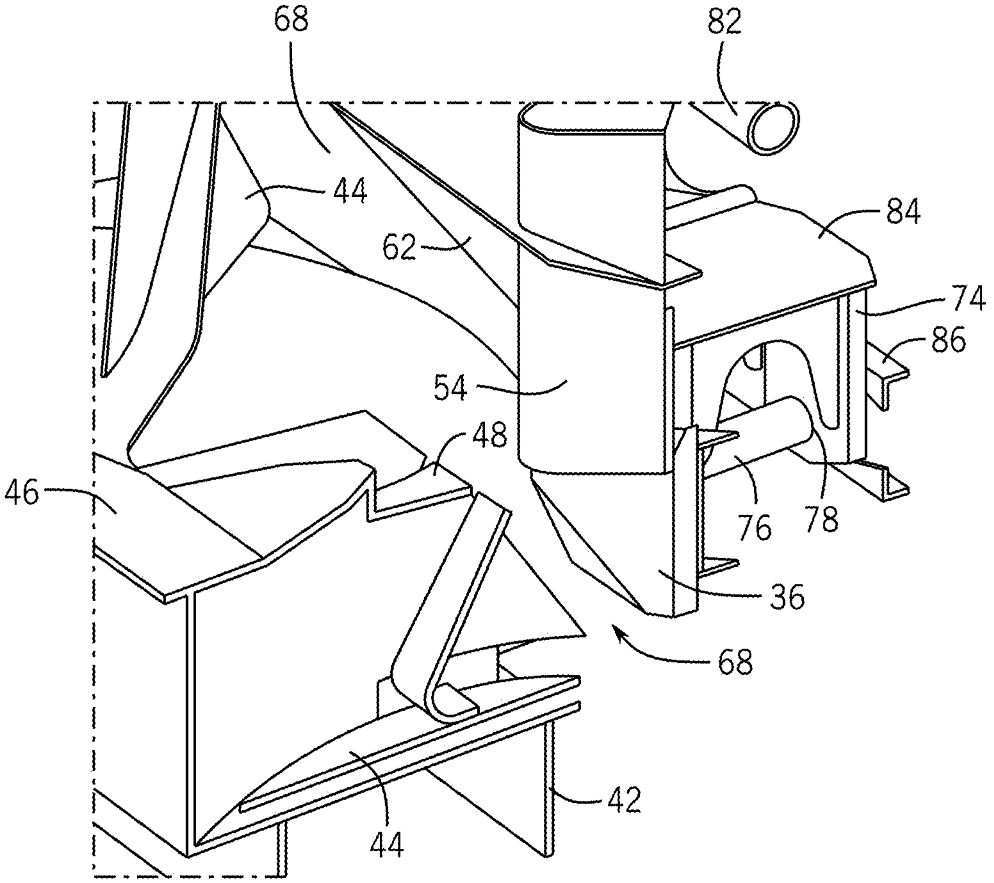
FIG. 14 is a cross-sectional detail of the crop residue spreader of FIG. 11 taken through plane D-D.
Figure 15:
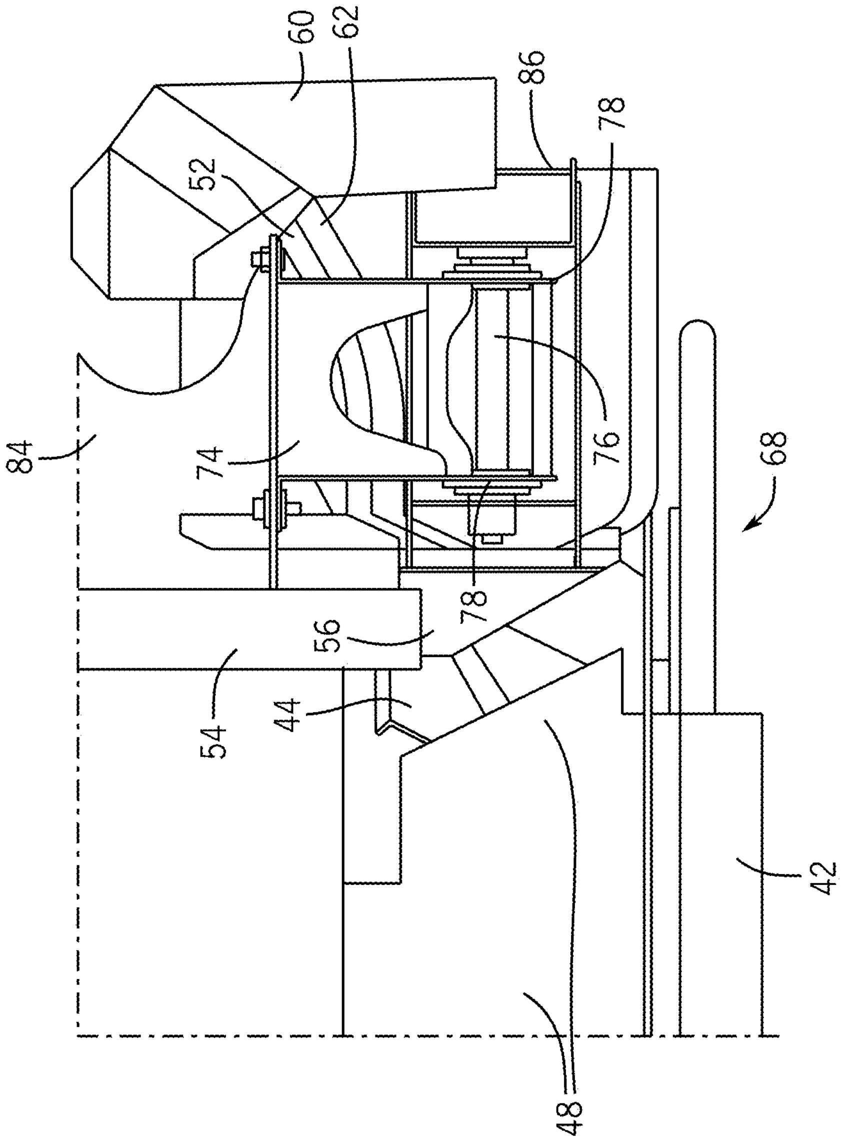
FIG. 15 is a side elevation cross-sectional detail view of the crop residue spreader of FIG. 11 taken through plane E-E.
Figure 16:
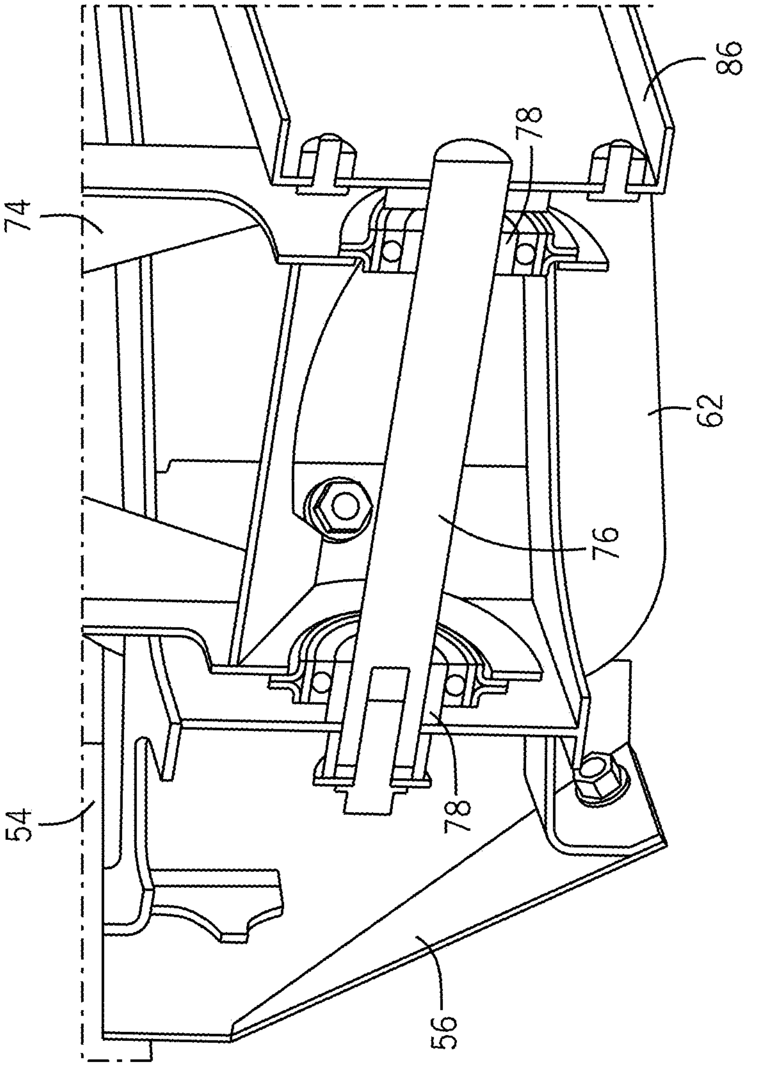
FIG. 16 is a cross-sectional detail view of the crop residue spreader of FIG. 11 taken through plane F-F.

Referring now to FIGS. 8 and 9, the independent connection of distribution hood 50 and spreader frame 42 to swing arms 66 (as shown in FIGS. 2-7) suspends distribution hood 50 above and away from spreader frame 42, forming gap 68 for crop residue to exit the spreader 36 without clogging or binding. In the embodiment illustrated, gap 68 is narrowest where the center section 48 of impeller housing 46 faces divider nose 54 and nose cap 56 of distribution hood 50. Gap 68 may be sized appropriately to permit crop residue to exit the spreader, typically at least about 50 mm clearance between the distribution hood 50 and spreader frame 42. Referring now also to FIG. 10, the surfaces of impeller housing center section 48 and nose cap 50 are oriented at about 30 degrees from vertical and diverge so that gap 68 widens in the direction of the crop residue exiting the impeller housing 46 and spreader 36. Preferably, the facing surfaces of the distribution hood 50 and the spreader frame 42 diverge a minimum of about five degrees from one another in the general direction of the exiting crop residue.

Referring further to FIGS. 10-16, oscillating deflector 62 is mounted on the distribution hood 50. At least partly enclosed within distribution hood divider 52, deflector mount bracket 84 is suspended from distribution hood frame 82. Deflector shaft mount 74 is bolted to deflector mount bracket 84 and supports deflector shaft 76 on deflector shaft bearings 78. Deflector shaft connects to deflector frame 86, and oscillating deflector 62 is mounted on deflector frame 86. Deflector driver 88 is connected to deflector frame 86 by pitman arm 80 and drives movement of deflector shaft 76 in a rotational, oscillatory pattern.

The deflector driver 88 may use any type of power, such as electrical, mechanical, or hydraulic power, to move the deflector 62. In one embodiment, deflector driver 88 can be, for example, a motor that is adapted to rotate deflector shaft 76 a predetermined number of degrees from a neutral position and then return deflector shaft 76 to the neutral position. Such motors are commonly employed to drive windshield wipers on various types of vehicles and can be readily adapted to use according to the present invention. By constantly oscillating the movement of the deflector 62 in this fashion, stripes of crop residue being formed on the field can be reduced or avoided by constantly varying the deflection pattern of the crop residue. For example, deflector driver 88 can oscillate the deflector 62 with an oscillation amplitude 2α of about 60° from a neutral position, but it is also contemplated that the oscillation amplitude 2α can be other values between 30° and 120°. A similar effect can also be obtained by linearly moving the deflector 62 from side-to-side with a deflector driver 88 that reciprocates the deflector 62, with many types of drivers (not illustrated) that can create reciprocating movement being known. Each stroke of the reciprocating movement can be adjusted to achieve a desired spread pattern.

Figure 17:
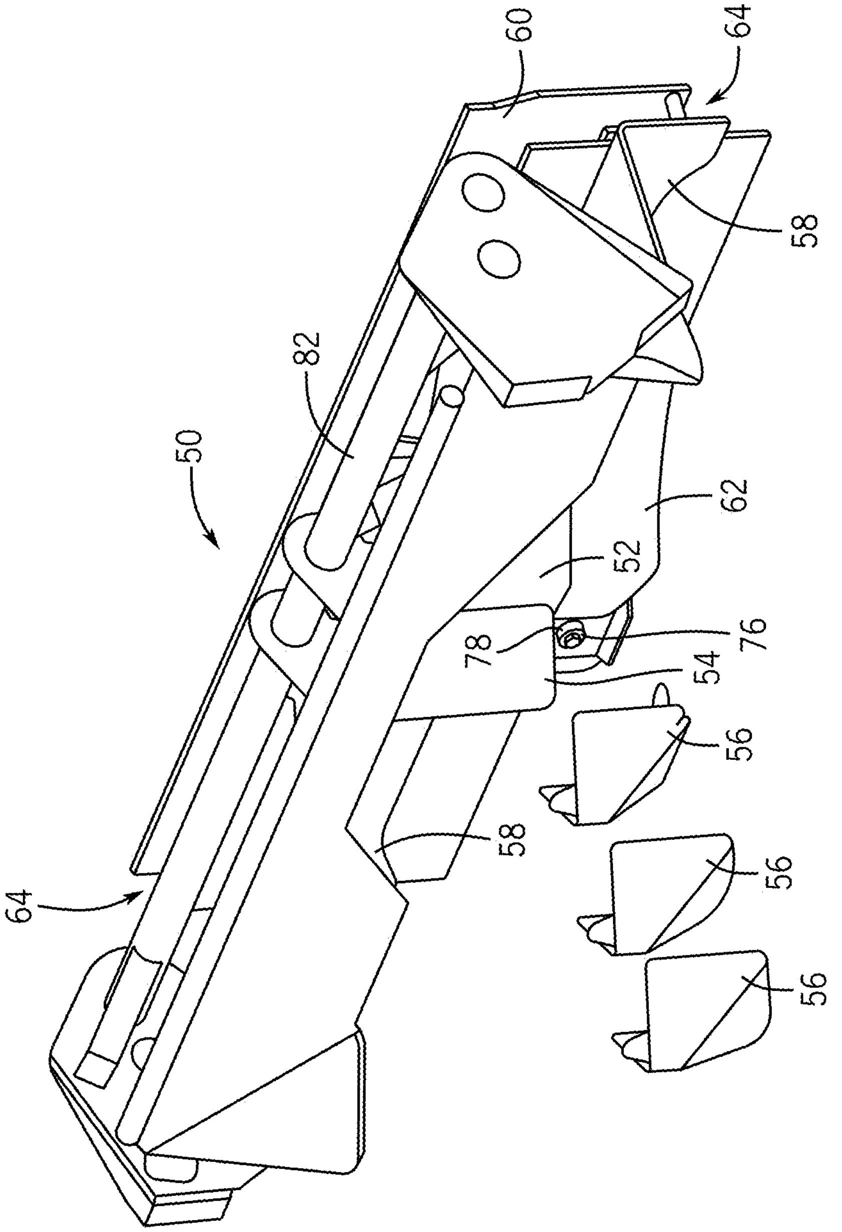
FIG. 17 is a partially exploded isometric detail of an embodiment of a crop residue spreader formed according to the present invention, showing the distribution hood divider and crop residue deflector.

Referring now to FIG. 17, distribution hood 50 is shown in more detail in a partially exploded view, wherein nose cap 56 is shown in various embodiments as different, replaceable wear components. Assembled for operation, nose cap 56 is fastened to oscillating deflector 62 over and covering the forward end of deflector shaft 76 and forward deflector shaft bearing 78. Being fastened to oscillating deflector 62, nose cap 56 rotates with the entire deflector assembly when deflector 62 is engaged and operating.

Referring now to FIGS. 18 and 19, it is seen where gap 68 is expanded by the pivoting movement of distribution hood 50 relative to spreader frame 42, upward and rearward from the forward position in which the distribution hood 50 is positioned to receive and distribute crop material ejected by impellers 44.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A crop residue spreader of an agricultural harvester, comprising:

a spreader frame;

one or more impellers mounted on the spreader frame that receive a crop residue from a crop threshing and/or cleaning system of the agricultural harvester and discharge the crop residue from the harvester;

a distribution hood mounted in close proximity to the impellers that distributes a flow of crop residue discharged by the impellers; and a common structural member that independently supports both the spreader frame and the distribution hood, the distribution hood being supported for pivotable movement relative to the spreader frame along a path from a forward distributing position in receiving and distributing the flow of crop material discharged by the impellers to a rear position upward and rearward of the forward distributing position.

2. The crop residue spreader of claim 1, wherein the distribution hood in the rear position is positioned at least partly outside the flow of crop material discharged by the impellers.

3. The crop residue spreader of claim 1, wherein a pivotable attachment of the distribution hood to the common structural member enables the pivotable movement of the distribution hood relative to the spreader frame along the path from the forward distributing position to the rear position.

4. The crop residue spreader of claim 1, further comprising a locking mechanism that fixes the distribution hood at one or more positions along the path from the forward distributing position to the rear position.

5. The crop residue spreader of claim 1, wherein the distribution hood in the rear position is positioned entirely outside the flow of crop material discharged by the one or more impellers.

6. The crop residue spreader of claim 1, wherein the common structural member is mounted to a straw hood of the agricultural harvester.

7. The crop residue spreader of claim 6, wherein the common structural member comprises one or more swing arms.

8. The crop residue spreader of claim 7, wherein the one or more swing arms comprise one or more pivot points enabling the pivotable movement of the spreader frame relative to the straw hood along a path from a forward spreading position to a rear position upward and rearward of the forward spreading position.

9. An agricultural harvester, comprising the crop residue spreader of claim 1.

10. The crop residue spreader of claim 1, wherein the spreader frame and the distribution hood form a gap enabling the discharging crop residue to exit the spreader.

11. An agricultural harvester, comprising:

a crop threshing and/or cleaning system that produces a flow or stream of crop residue;

a rear cavity enclosed by a straw hood that receives the flow or stream of crop residue from the threshing and/or cleaning system; and a crop residue spreader of the agricultural harvester, the crop residue spreader comprising:

a spreader frame;

one or more impellers mounted on the spreader frame that receive the crop residue from the crop threshing and/or cleaning system of the harvester and discharge the crop residue from the harvester;

a distribution hood mounted in close proximity to the impellers that distributes the flow of crop residue discharged by the impellers; and a common structural member that independently supports both the spreader frame and the distribution hood, the distribution hood being supported for pivotable movement relative to the spreader frame along a path from a forward distributing position in receiving and distributing the flow of crop material discharged by the impellers to a rear position upward and rearward of the forward distributing position.

12. The agricultural harvester of claim 11, wherein the distribution hood in the rear position is positioned at least partly outside the flow of crop material discharged by the impellers.

13. The agricultural harvester of claim 11, wherein a pivotable attachment of the distribution hood to the common structural member enables the pivotable movement of the distribution hood relative to the spreader frame along the path from the forward distributing position to the rear position.

14. The agricultural harvester of claim 11, further comprising a locking mechanism that fixes the distribution hood at one or more positions along the path from the forward distributing position to the rear position.

15. The agricultural harvester of claim 11, wherein the distribution hood in the rear position is positioned entirely outside the flow of crop material discharged by the one or more impellers.

16. The agricultural harvester of claim 11, wherein the common structural member is mounted to a straw hood of the agricultural harvester, the common structural member comprises one or more swing arms, and the one or more swing arms comprise one or more pivot points enabling the pivotable movement of the spreader frame relative to the straw hood along a path from a forward spreading position to a rear position upward and rearward of the forward spreading position.

17. The agricultural harvester of claim 11, wherein the spreader frame and the distribution hood form a gap enabling the discharging crop residue to exit the spreader.

* * * * *